Figure 2:
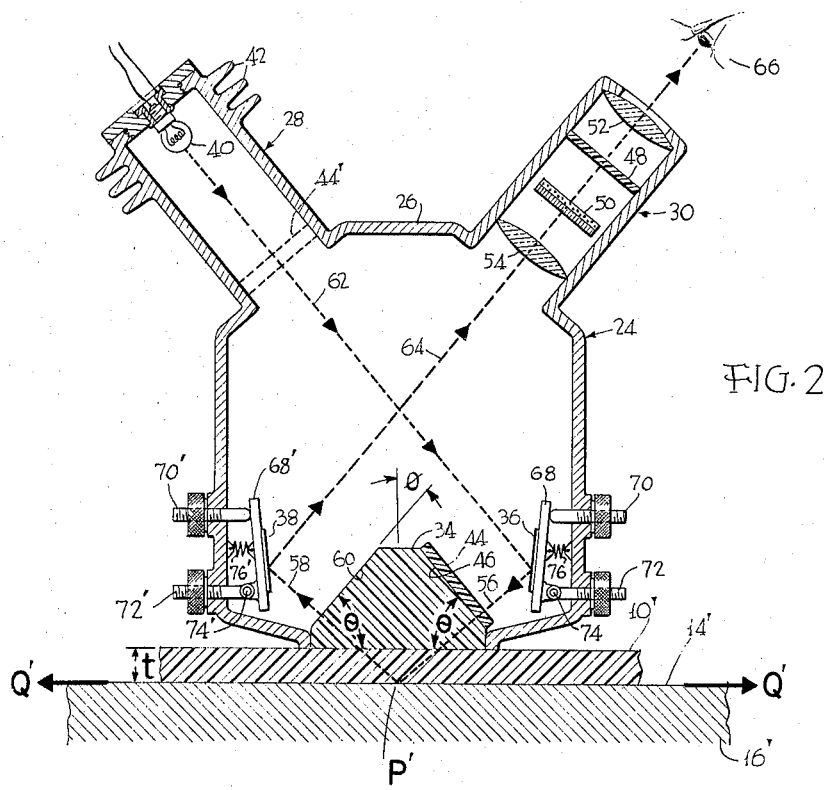

April 19, 1966     S. REDNER     3,246,558

PRINCIPAL STRAIN RESOLUTION BY PHOTOELASTIC MEANS

Filed Nov. 30, 1961

INVENTOR.
Salomon Redner
BY
ATTORNEY

United States Patent Office 3,246,558
Patented Apr. 19, 1966

3,246,558
PRINCIPAL STRAIN RESOLUTION BY PHOTOELASTIC MEANS
Salomon Redner, Norristown, Pa., assignor to The Budd Company, Philadelphia, Pa., a corporation of Pennsylvania
Filed Nov. 30, 1961, Ser. No. 156,074
6 Claims. (Cl. 88—14)

This invention relates to means and methods for the resolution and quantitative indication of the magnitude of a principal strain acting at a workpiece surface region. More particularly, this invention pertains to photoelastic methods and means whereby a testpiece of forced-birefringent material bonded to the surface of a workpiece is observed by means of ordinary light to yield a direct indication proportional to one, only, of the principal strains acting at a workpiece surface region.

In conventional prototype photoelasticity, observations are of difference information. The normally isotropic testpiece material becomes anisotropic at each included region in proportion to the magnitude of the differences between maximum and minimum normal stresses set up in that region due to surface strains of the workpiece. Polarized light transmitted through the testpiece material is resolved into two mutually perpendicularly plane polarized components respectively parallel with the directions of the maximum and minimum normal stresses. The propagation velocities of the two components differ in proportion to the stress difference, resulting in a retardation of one of the components relative to the other. There is a consequent phase shift between the components and, upon analysis of the transmitted light, destructive interference subtraction of those colors for which the relative retardation is one half wave length. The final result is a predominance in the observed light of colors complementary to those subtracted. The observable color patterns are an indication of difference information and not, directly, of unidirectional elastic effects generated at the workpiece surface.

The conventional patterns of forced-birefringence yield direct definition of workpiece surface strain concentrations and of workpiece strain trajectories throughout extended areas. However, two separate observations at the testpiece region have been required for the resolution of unidirectional effects. The usual procedure being to obtain one set of data along light paths normal to the region and a second set of data along light paths at an oblique transmission angle. The two sets of data allow mathematical solution of two equations relating the orthogonal testpiece stresses and calculation of testpiece and of workpiece principal strain magnitudes may then follow this indirect resolution of testpiece principal stresses.

Details of a refined approach to the observation of the normal and oblique incidence birefringence are set forth in the copending application of Felix Zandman, S.N. 3,049, filed January 18, 1960, now U.S. Patent 3,096,175, and assigned to the same assignee as is this invention. Alternative procedures employ special strain gauges for the resolution of principal workpiece average strain magnitudes as, for example, the washer-type photoelastic strain gauge of U.S. Patent 3,034,341 of Georges Golubovic, assigned to the same assignee as is this invention.

However, there has not been a satisfactory system or method which may be generally employed in conjunction with bonded photoelastic testpieces for the direct resolution of workpiece principal strain magnitudes acting at incremental areas of a workpiece surface.

Therefore, it is a general object of this invention to provide improved photoelastic means and methods whereby the individual magnitude of a workpiece principal strain is indicated directly upon but a single observation.

A further object is to provide improved photoelastic means and methods yielding direct resolution of the magnitude of a principal strain along a minimum gauge length at the surface of a workpiece.

Another object is to provide improved photoelastic means and methods readily employable in conjunction with extended area bonded photoelastic testpiece procedures and apparatus for the direct resolution of the magnitude of a workpiece principal strain acting at an incremental area of the workpiece surface.

According to a preferred method of this invention, a testpiece of photoelastic material is adhesively bonded to the surface area of a workpiece where a principal strain magnitude is to be resolved, normal incidence polarized light is directed into and out of the testpiece material and analyzed defining workpiece principal stress concentrations and directions, polarized light is directed into and out of the testpiece material along an oblique transmission angle perpendicular to the direction of the strain to be resolved and at oblique transmission angle with respect to the other principal workpiece strain, the oblique angle being predetermined as the angle whose cosine is equal to the square root of Poisson's ratio for the testpiece material, and the light transmitted through the testpiece at the oblique angle is analyzed to provide a direct visual indication of the resolved magnitude of the required principal strain.

Preferred apparatus according to this invention comprises a testpiece of forced-birefringent material bonded adhesively to the workpiece surface, a source of polarized light, an analyzer for transmitted polarized light, and light directing means directing light from said source into and out of said testpiece and thereafter through said analyzer along a path through said testpiece perpendicular to the direction of one workpiece principal strain and at an oblique angle with respect to the other principal strain, the oblique angle being the angle whose cosine is equal to the square root of Poisson's ratio for the testpiece material.

Figure 1:
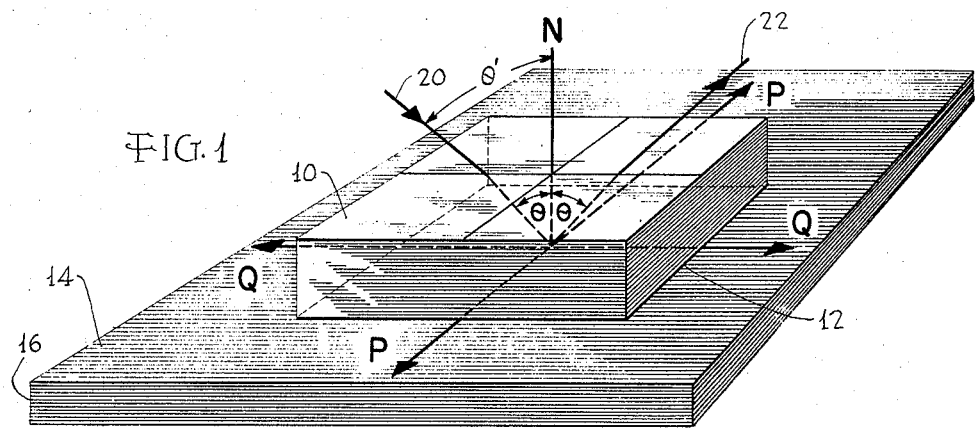

While the invention is particularly pointed out and distinctly claimed in the claims appended to this specification, further objects and advantages thereof will be had upon consideration of the following description taken in conjunction with the drawing wherein:

FIG. 1 is a schematic illustration useful in explaining basic concepts of the invention, and FIG. 2 is a cross section view of a preferred apparatus embodying the invention.

With particular reference to FIG. 1, a photoelastic testpiece 10 of forced-birefringent material such as Bakelite is adhesively bonded by means of a cement layer 12 to a surface 14 of a workpiece 16. Reflection is provided for at the workpiece-testpiece interface by surface 14, by cement layer 12, or by a metallic coating applied to testpiece 10. The workpiece is assumed to be subjected to loading forces which develop principal surface unit strains $e_p$ and $e_q$ in the directions P, P and Q, Q as indicated. When the directions P, P and Q, Q cannot be assumed from a knowledge of the loading condition, they may be determined from conventional observation parallel with the normal N. It is assumed that the magnitude of $e_p$ is required, although the following analysis is general and applicable to the resolution of either principal strain.

For detailed development of photoelastic relationships reference may be had to Photoelasticity, M. M. Frocht, vol. I, 1941, John Wiley and Sons, New York. However, the following explanation may be convenient. Testpiece 10 is integrally attached to workpiece surface 14 and will be deformed, strained, equally with workpiece surface 14. Therefore, $e_p$ and $e_q$ may also represent the principal testpiece strains. When testpiece 10 is deformed, internal restoring stresses are generated within its material which then exhibits forced-birefringence in transmitted polarized light. The forced-birefringence is directly related to the difference between the maximum and minimum stresses normal to the path of the transmitted light according to the stress optic law by:

$$B = k(s_1 - s_2), \qquad \text{I}$$

where B is the forced-birefringence per unit light path length, $k$ is the optical strain sensitivity constant of the photoelastic material, and $s_1$ and $s_2$ are the principal stresses in planes normal to the light paths.

If the light paths are constrained, as indicated in the figure by incident ray 20 and reflected ray 22, to traverse testpiece 10 at an oblique angle $\theta$ with respect to the normal N and at 90° to principal strain direction P, P, then the birefringence equation becomes:

$$B = k(s_p - s_q \cos^2 \theta), \qquad \text{II}$$

where $s_p$ is the principal testpiece stress parallel with P,P and $s_q$ is the principal testpiece stress parallel with Q,Q.

The principal testpiece stresses are related to the principal testpiece strains according to:

$$s_p = (e_p + \mu e_q) E / (1 - \mu^2) \qquad \text{III}$$

$$s_q = (e_q + \mu e_p) E / (1 - \mu^2) \qquad \text{IV}$$

where $\mu$ is Poisson's ratio and E is Young's modulus for the testpiece material.

By substitution of the relationships between principal stresses and strains, forced-birefringence may be given in terms of principal strains as:

$$B = k[(e_p + \mu e_q) - (e_q + \mu e_p) \cos^2 \theta] E / (1 - \mu^2). \qquad \text{V}$$

In general the oblique angle $\theta$ within testpiece 10 is restricted to small angles because of refraction, the external incidence angle $\theta'$; the angle described with respect to the normal by incident light rays in air, being limited theoretically to less than 90° and practically to considerably smaller angles. However, as will be explained in connection with FIG. 2, below, there is achieved according to this invention, a critical relationship between oblique angles $\theta$ and Poisson's ratios $\mu$ for conventional photoelastic materials. This relationship may be stated as:

$$\theta = \cos^{-1} \mu^{1/2} \qquad \text{VI}$$

Assuming that the critical relationship VI can be achieved with practical means, then $$\cos^2 \theta = \mu \qquad \text{VII}$$

may be substituted in the general Equation V to relate birefringence with principal strain difference quantities according to:

$$B = k[(e_p + \mu e_q) - (e_q + \mu e_p)\mu] E / (1 - \mu^2) \qquad \text{VIII}$$

where the positive and negative coefficients for one of the unknowns, $e_q$, are equal. Therefore, the latter unknown may be eliminated and Equation VIII reduces to:

$$B = k(e_p - \mu^2 e_p) E / (1 - \mu^2) \qquad \text{IX}$$

$$B = k e_p (1 - \mu^2) E / (1 - \mu^2) \qquad \text{X}$$

$$B = K e_p \qquad \text{XI}$$

where K is a characteristic constant of the photoelastic material.

Restated, the birefringence per unit path length produced in polarized light transmitted through a photoelastic testpiece bonded to a workpiece may be related directly to, and may therefore resolve the magnitude of, one principal workpiece strain when the light path is perpendicular to that principal strain and, with respect to the normal, at an angle whose cosine is equal to the square root of Poisson's ratio for the testpiece material. Therefore, according to this invention, a single observation of forced-birefringence yields directly the magnitude of a workpiece surface principal strain. The constant K may be calculated from a knowledge of strain sensitivity $k$ and elastic modulus E of a given photoelastic testpiece material. Otherwise, K may be determined empirically for a given material by applying known loads generating known principal strain magnitudes in an experimental workpiece-testpiece combination. In either case a new proportionality constant may be defined to include a factor for the optical path length through the testpiece, a function of $\theta$ and of testpiece thickness $t$.

With reference now to FIG. 2, a preferred indicator is illustrated for the resolution of the magnitude of a principal workpiece strain according to this invention. Indicator 24 is shown in position with respect to a photoelastic testpiece 10' bonded to a workpiece 16'. The testpiece-workpiece interface is assumed to be reflecting, as when workpiece surface 14' itself serves as a reflector. The orientation shown is for resolution of the principal workpiece strain directed normally of the cross section as indicated by P', the other principal strain being directed along Q', Q'.

A housing 26 forms a protective enclosure and a structural support for the indicator elements which comprise light source 28, analyzer 30, and light directing means. The light directing means includes rectilinear prism 34 and plane mirrors 36 and 38 oriented symmetrically with respect to the prism. Light source 28 is provided with a lamp 40 and cooling fins 42, and may include a polarizer at 44'; however, to reduce heat dissipation problems caused by proximity with lamp 40, the polarizer 44 is preferably located contiguous with the incident face 46 of prism 34. Analyzer 30 includes a second polarizer 48 and may be provided with a Babinet type compensator 50 and ocular and objective lenses 52 and 54 in the order illustrated.

Assuming the prism half-angle $\phi$ to be the complement of an angle $\theta$ defined according to Equation VI above, and the refractive indices of the prism and testpiece materials to be substantially equal, light rays 56 and 58 directed normally of the prism faces 46 and 60 will traverse testpiece 10' at the oblique angle $\theta$ without substantial refraction. Therefore, mirror 36 is oriented to direct light along ray 62 from source 28 to the direction $\theta$ along ray 56 and, conversely, mirror 38 is oriented to divert emergent light along ray 58 to the path of ray 64 through analyzer 30.

It is preferable that source 28 and analyzer 30 are separated and divergent for convenience of the observer at 66 and the symmetrical back-reflecting arrangement allows a rigid and precise structure to be manufactured economically. Conventional light source and analyzer assemblies are readily adapted to this configuration and an indicator of optimum, compact dimensions results.

Returning to the prescription of the oblique incidence angle $\theta$ for the light transmitted through testpiece 14', it has been disclosed that this angle is to be related to Poisson's ratio for the material of testpiece 10'. The latter characteristic constant varies among the conventional photoelastic materials from about $\mu_{min} = .33$ to about $\mu_{max} = .43$. Corresponding values of the oblique transmission angle calculated by means of Equation VI above are 55° and 49°, respectively. Since the curve of $\theta$ versus $\mu$ is very nearly linear in this range, no appreciable error is introduced by that assumption as may be seen in the following tabulation:

TABLE I
$[\mu = \cos^2 \theta]$

| $\theta$ | $\mu$ | $\theta$ | $\mu$ |
|---|---|---|---|
| 55° | .329 | 52° | .379 |
| 54° | .346 | 51° | .397 |
| 53° | .362 | 50° | .430 |

Therefore, the apparatus of FIG. 2 is adapted for use with the conventional photoelastic testpiece materials having differing Poisson's ratios by the inclusion of angular adjustment means for mirrors 36 and 38. For example, mirror 36 is mounted on a plate 68 which is rotatably positioned by screws 70 and 72. Plate 68 is connected to screw 72 by a universal joint 74 and held against screw 70 by a tension spring 76. Similar means are provided for mirror 38 as indicated by the primed reference numerals 68', 70', 72', 74', and 76'. The angular orientation of the mirrors 36 and 38 may be adjusted conveniently by adjusting the length of one of the screws 70, 70' relative to the other 72, 72'. Refraction upon entry and emergence at prism faces 46 and 60 must be compensated for; however, rays 56 and 58 will be still nearly normal to the respective prism faces so that this correction is small and again very nearly linearly related to Poisson's ratio variations from the mean. Since the maximum error introduced with this apparatus by employing the mean value of Poisson's ratio is within five percent for conventional materials, the maximum error after any reasonable adjustment of mirrors 36 and 38 is well below the other uncertainties of photoelastic observations. In fact, it is quite practical to employ the one oblique incidence angle $\theta=53°$ as calculated for $\mu=.36$ in all routine investigations of principal strain magnitudes.

Another refinement which may be taken advantage of when necessary is that translation of mirrors 36 and 38 toward or away from prism 34 will compensate the depth of the intersection of rays 56 and 58 below prism 34 to accommodate variations in the thickness of the testpiece 10'. This translation is readily accomplished by equal length adjustment of each pair of screws 70, 72 and 70', 72'. Again, however, this adjustment is usually unnecessary since the field of view of the polariscope elements 28 and 32 is not restricted to a single ray but, encompasses a beam of considerable lateral area. Those rays which are reflected from the testpiece-workpiece interface in the vicinity of any given point may be selected for observation by translation of the observation position from that indicated at 66. The accommodation thus provided for is greater than the range of testpiece thickness usually encountered.

One other optical instrumentation means, not specifically illustrated in the drawing, that should be recognized here is the use of a liquid coupling between the bottom surface of prism 34 and the upper surface of testpiece 10'. A drop of silicone oil or the like having a refractive index about that of the prism and testpiece materials will wet the mating surfaces, fill any irregularities, and assure that no significant refraction occurs at the interface.

Having thus described and illustrated a preferred embodiment it will be apparent that various modifications are possible without departing from the invention. The underlying principle, however, is that birefringence produced in investigatory polarized light transmitted through a photoelastic testpiece in a plane substantially normal to the testpiece along a direction substantially normal to a given principal testpiece strain and at an angle with the other principal strain whose cosine is equal substantially to the square root of Poisson's ratio for the testpiece material, is directly related to the magnitude of the given principal strain and independent of the magnitude of the other principal strain. When a prism having its bottom surface contiguous with testpiece surface opposite to a reflecting testpiece surface and having two side surfaces diverging from the bottom surface at that angle, is arranged with its side surfaces parallel to the given principal strain, light incident normally upon one of the side surfaces will traverse the testpiece along the prescribed direction. When the testpiece strain is that of a loaded workpiece to which the testpiece is attached, the observable birefringence is directly related to the equal workpiece surface strain.

Therefore, no restriction of the invention is intended except as defined in the accompanying claims.

What is claimed is:

1. A photoelastic strain indicator system for determination of the magnitude of a given principal strain acting at the surface of a loaded workpiece, which system consists essentially of:
   a testpiece of forced-birefringent material adhesively bonded to the workpiece surface, a reflector interposed between the testpiece and the workpiece, and an indicator;
   said indicator comprising a supporting structure, and mounted upon said structure a source of polarized light, an analyzer for said light, and light directing elements;
   said light directing elements including a prism of a material having a refractive index equal substantially to the refractive index of the testpiece material, said prism having a bottom surface and first and second side surfaces each diverging from said bottom surface at the angle $\theta$ defined by $\theta=\cos^{-1}\mu^{\frac{1}{2}}$, $\mu$ being Poisson's ratio for the material of the testpiece, said bottom surface being contiguous with the upper surface of said testpiece and said side surfaces being parallel with the given principal strain;
   said light source being above and at the second surface side of said prism, and said analyzer being above and at the first surface side of said prism;
   said light directing elements further including adjustable plane mirrors directing a beam of light from said source in a path substantially normal to said side surfaces into said first side surface through said prism and said testpiece to said reflector and, upon reflection from said reflector, through said testpiece and said prism out of said second side surface to said analyzer;
   whereby observable forced-birefringence is directly related to the magnitude of the given principal workpiece strain.

2. A photoelastic strain indicator system for determination at the magnitude of a given principal strain acting at the surface of a loaded workpiece, which system consists essentially of:
   a testpiece of forced-birefringent material adhesively bonded to the workpiece surface, a reflector interposed between the testpiece and the workpiece, and an indicator;
   said indicator comprising a supporting structure, and mounted upon said structure a source of polarized light, an analyzer for said light, and light directing elements;
   said light directing elements including a prism of a material having a refractive index equal substantially to the refractive index of the testpiece material, said prism having a bottom surface and two side surfaces each diverging from said bottom surface at the angle $\theta$ defined by $\theta=\cos^{-1}\mu^{\frac{1}{2}}$, $\mu$ being Poisson's ratio for the material of the testpiece, said bottom surface being contiguous with the upper surface of said testpiece and said side surfaces being parallel with the given principal strain;
   said light directing elements further including adjustable plane mirrors directing a beam of light from said source in a path substantially normal to said side surfaces through said prism and said testpiece to said reflector and, upon reflection from said reflector, through said testpiece and said prism to said analyzer;
   whereby observable forced-birefringence is directly related to the magnitude of the given principal workpiece strain.

3. A photoelastic strain indicator system for determination of the magnitude of a given principal strain acting at the surface of a loaded workpiece, which system consists essentially of:
   a testpiece of forced-birefringent material adhesively bonded to the workpiece surface, a reflector interposed between the testpiece and the workpiece, and an indicator;

said indicator comprising a supporting structure and, mounted upon said structure, a source of polarized light, an analyzer for said polarized light, and light directing elements;

said light directing elements directing light along a path from said source through said testpiece to said reflector and, upon reflection by said reflector, through said testpiece to said analyzer, the portions of said path within said test piece being normal to the given principal strain and at an angle $\theta$ with respect to the other principal strain defined by $\theta = \cos^{-1}\mu^{1/2}$, $\mu$ being Poisson's ratio for the material of the testpiece;

whereby observable forced-birefringence is directly related to the magnitude of the given principal workpiece strain.

4. An indicator for a photoelastic system useful in the determination of the magnitude of a given principal strain acting at the surface of a loaded workpiece to which a photoelastic testpiece is adhesively bonded with a reflector interposed between the testpiece and the workpiece, said indicator comprising:

a supporting structure and, mounted upon said structure, a source of polarized light, an analyzer for said light, and light directing elements;

said light directing elements including a prism of a material having a refractive index equal substantially to the refractive index of the testpiece material;

said prism having a bottom surface and two side surfaces each diverging from said bottom surface at the angle $\theta$ defined by $\theta = \cos^{-1}\mu^{1/2}$, $\mu$ being Poisson's ratio for the material of the testpiece;

said light directing elements further including adjustable plane mirrors directing a beam of light from said source in a path substantially normal to said side surfaces through said prism and said testpiece through said reflector and, upon reflection from said reflector, through said testpiece and said prism to said analyzer when said bottom surface of said prism is contiguous with the upper surface of the testpiece;

whereby observable forced-birefringence is directly related to the magnitude of the given principal strain when the side surfaces of the prism are oriented parallel with that strain.

5. A photoelastic indicator combination for use with reflecting polariscope means including a source of polarized light, an analyzer for said light, and light directing means, for the determination of the magnitude of a given principal strain, comprising:

a testpiece of forced-birefringent material and a prism of a material having an index of refraction substantially equal to that of the testpiece;

said prism having a bottom surface and two side surfaces diverging from said bottom surface at an angle $\theta$ defined by $\theta = \cos^{-1}\mu^{1/2}$, $\mu$ being Poisson's ratio for the material of the testpiece, the prism side surface being parallel with one principal strain;

the bottom surface of said prism and a surface of said testpiece being contiguous and a liquid having an index or refraction substantially equal to that of the testpiece and of the prism filling any voids at the interface between the contiguous workpiece and prism surfaces;

whereby a beam of light from said light source is directed in a path substantially normal to the side surfaces of the prism through the prism and said testpiece to said analyzer, and the observable forced-birefringence is directly relatable to a principal strain imposed upon the testpiece.

6. A photoelastic method for determination of the magnitude of a given principal strain acting at the surface of a loaded workpiece, which method comprises the steps of adhesively bonding a testpiece of forced-birefringent material to the workpiece surface by means of a reflecting cement, directing polarized light into the testpiece to the reflector and, after reflection by the reflector, out of said testpiece along a path within said testpiece normal to the given principal strain at an angle $\theta$ with respect to the other principal strain defined by $\theta = \cos^{-1}\mu^{1/2}$, $\mu$ being Poisson's ratio for the material of the testpiece, and analyzing the transmitted light, whereupon observable forced-birefringence is directly related to the magnitude of the given principal workpiece strain.

References Cited by the Examiner

UNITED STATES PATENTS

| | | |
|---|---|---|
| 2,042,257 | 5/1936 | Harrison et al. |
| 2,108,173 | 2/1938 | Martin et al. _____ 88—14 X |
| 2,708,857 | 5/1955 | Golding _____ 88—14 |

FOREIGN PATENTS

| | | |
|---|---|---|
| 1,138,768 | 2/1957 | France. |
| 1,148,457 | 6/1957 | France. |

JEWELL H. PEDERSEN, *Primary Examiner.*

T. L. HUDSON, *Assistant Examiner.*